United States Patent [19]

Taylor

[11] Patent Number: 5,285,576
[45] Date of Patent: Feb. 15, 1994

[54] TOOL FOR GROOVING OR CUTTING PIPES

[76] Inventor: Clive N. Taylor, 15 Canford Cliffs Road, Poole Dorset BH13 7YF, United Kingdom

[21] Appl. No.: 793,381

[22] PCT Filed: Nov. 22, 1989

[86] PCT No.: PCT/GB89/01392
§ 371 Date: Jan. 14, 1992
§ 102(e) Date: Jan. 14, 1992

[87] PCT Pub. No.: WO90/05610
PCT Pub. Date: May 31, 1990

[30] Foreign Application Priority Data

Nov. 22, 1988 [GB] United Kingdom ............... 8827226

[51] Int. Cl.⁵ .................... B23D 21/06; B26D 3/16
[52] U.S. Cl. ................................ 30/94; 30/93; 30/101
[58] Field of Search ............ 30/92, 93, 94, 95, 101; 51/90, 56, 391, 392, 241.5; 401/152, 197, 208, 219, 220

[56] References Cited

U.S. PATENT DOCUMENTS

| | | | |
|---|---|---|---|
| 3,216,110 | 11/1965 | Stallings | 30/101 |
| 3,335,492 | 8/1967 | Spiro | 30/101 |
| 3,651,569 | 3/1972 | Arnot | 30/95 |
| 4,078,304 | 3/1978 | Netzel | 30/101 |
| 4,103,419 | 8/1978 | Mathews et al. | 30/95 |
| 4,769,911 | 9/1988 | Araki | 30/94 |
| 4,890,385 | 1/1990 | VanderPol et al. | 30/94 |

FOREIGN PATENT DOCUMENTS

WO86/03439 6/1986 PCT Int'l Appl.
528203 10/1940 United Kingdom.

Primary Examiner—Richard K. Seidel
Assistant Examiner—Paul M. Heyrana, Jr.
Attorney, Agent, or Firm—Burns, Doane, Swecker & Mathis

[57] ABSTRACT

A hand tool or grooving or cutting pipes has an aperture for receiving a portion of pipe, and adjustable support means. A cutting or grooving wheel is displaceable along a predetermined path to cause it to move radially relative to the pipe, as the tool is manually rotated round the pipe.

20 Claims, 3 Drawing Sheets

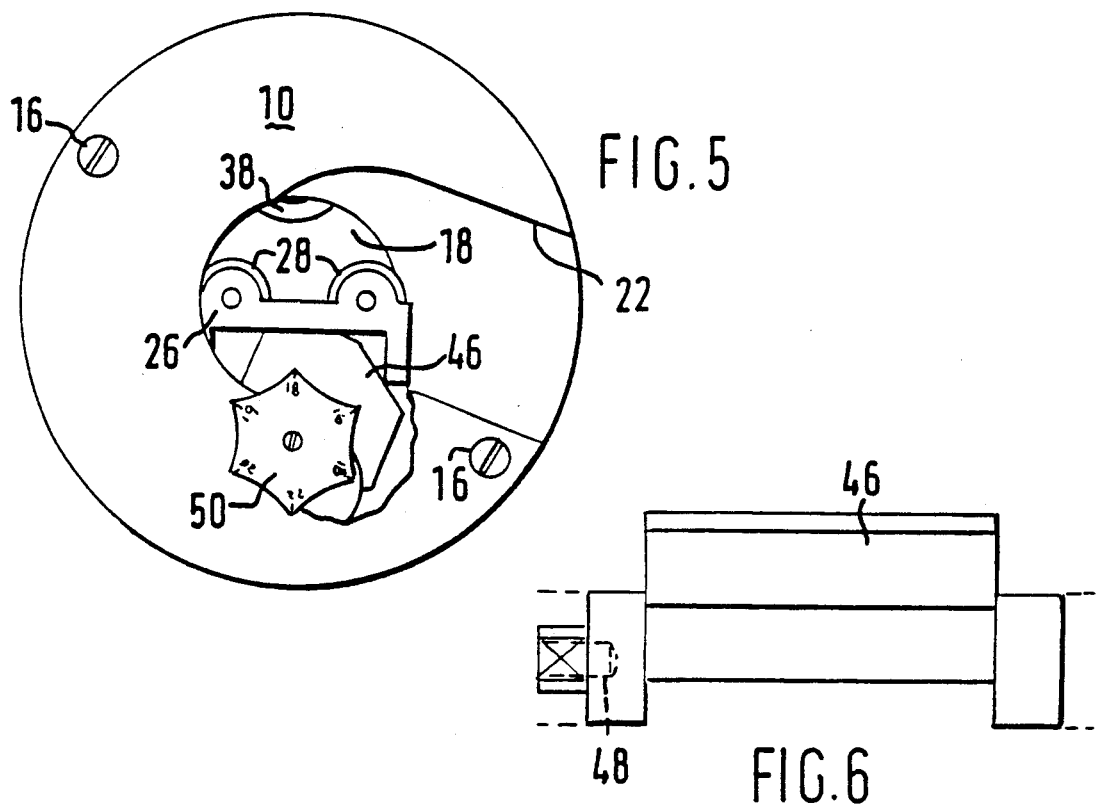

1

TOOL FOR GROOVING OR CUTTING PIPES

BACKGROUND OF THE INVENTION

The present invention relates to a tool for grooving or cutting pipes. It particularly relates to a hand tool capable of dealing with a range of pipe diameters.

International patent application WO86/03439 discloses a pipe cutter formed as a single cylinder having an entry slot. This device suffers from the disadvantage that it is not possible to make a quick, simple and accurate adjustment for a different diameter of pipe.

SUMMARY OF THE INVENTION

It is an object of this invention to provide a new or improved tool for grooving or cutting pipes which overcomes or reduces this disadvantage.

According to this invention, there is provided a tool for treating a pipe, said tool comprising a body having an aperture for receiving a portion of a pipe to be treated, pipe support means displaceably mounted on the body so as to be displaceable to project into the aperture to a variable extent, and a pipe-treating wheel rotatably mounted on the body so that a pipe portion in the aperture is engageable between the pipe-treating wheel and the pipe support means, the pipe-treating wheel being displaceable along a predetermined path relative to the pipe portion such that its operative portion moves inwardly relative to the pipe portion, in which the tool further includes a rotatably mounted cam arranged to adjust the position of the support means.

Thus, the cam may displace the pipe support means to allow different pipes to be treated by the tool of this invention.

Preferably, the cam has a plurality of cam flats arranged at respective predetermined distances from its rotational axis.

Conveniently, the support means comprises two support rollers arranged to define an isosceles triangle with the pipe-treating wheel when the pipe-treating wheel is at an intermediate location on its path, the support rollers being mounted on a block which is displaceable along the axis of symmetry of the triangle.

Desirably, the operative portion of the pipe-treating wheel moves both radially and circumferentially relative to the pipe portion, the path being selected so that, when the tool is rotated relative to the pipe, the pipe-treating wheel is urged against the pipe to effect treatment.

Preferably, the path of the pipe-treating wheel is tangential to an arc of a circle whose centre lies at the centre of the tool.

Conveniently, the pipe-treating wheel is rotationally fixed with an axle pin which is rotatably located in an elongate slot which defines said predetermined path of displacement.

Said elongate slot may be a linear slot.

Alternatively, the body of the tool may be formed in two parts, one part carrying the pipe-treating wheel and the other part carrying the pipe support means, the two parts being hingedly connected together, and the tool further comprising a compression spring arranged to urge the two parts of the tool together.

Preferably, the tool includes means for urging the pipe-treating wheel inwardly along said predetermined path. This is to urge it to contact a pipe. When contact is established, rotation of the tool relative to the pipe urges the pipe-treating wheel against the pipe to effect treatment.

The pipe-treating wheel may be a form roller for forming a groove in the pipe or a cutting wheel for cutting the pipe.

BRIEF DESCRIPTION OF THE DRAWINGS

The present invention will now be described in greater detail by way of example only, with reference to the accompanying drawings in which:

FIG. 5 is an axial view of the tool partly cut away and showing an adjustable cam embodying the invention;

FIG. 6 is a side view of the cam shown in FIG. 5;

DETAILED DESCRIPTION OF THE PREFERRED EMBODIMENTS

Figure 3:
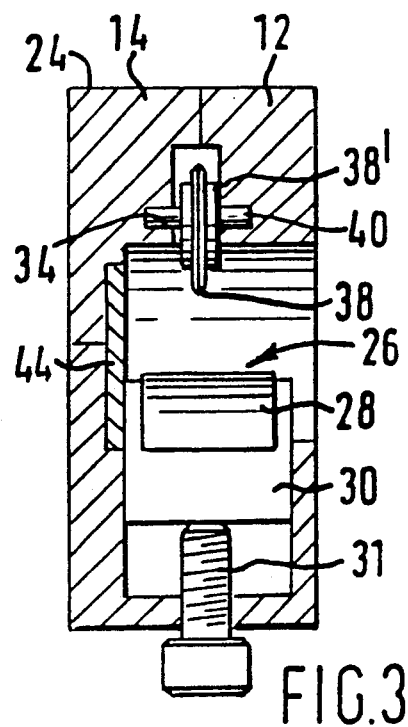
FIG. 3 is a section view along the line III—III of FIG. 2 showing an adjustment arrangement which does not form part of this invention.

A generally cylindrical metal body 10 is formed of two generally cylindrical portions 12, 14 secured together by screws 16. The body has a central opening 18 extending axially from a front face 20 of one portion 12, completely through that portion and part way through the other portion 14. The opening 18 also extends laterally to an opening 22 in the composite cylindrical face 24. The mating faces of the portions 12, 14 have recesses for housing further components. Thus there is a pipe support assembly 26 comprising a spaced coplanar pair of support rollers 28 rotatably mounted on a block 30. The block 30 is slideably mounted in a radially extending recess 32 so that it is displaceable in the direction of a diameter of the body, about which the support rollers 28 are symmetrical. There may be spring means (not shown) urging the support assembly 26 inwardly. There may be locking means (not shown), e.g. involving a locking pin passed through an aperture in the body 10 to lock the support assembly in a desired radial position. In FIG. 3, there is shown an adjusting means which does not form part of this arrangement for the support assembly 26 in the form of a screw 31.

FIGS. 5 and 6 show a support roller adjusting arrangement forming part of this invention. The support assembly 26 again comprises a spaced coplanar pair of support rollers 28 and it is adjustably mounted on a cam 46. The cam 46 is rotatably mounted on an axially extending pin 48 and it is turned by means of an adjustable knurled knob 50 until the desired cam flat on the cam 46 positions the pipe support assembly 26 in the correct position for the pipe to be grooved. By this means the distance between a pipe-treating wheel 38 and the pipe support assembly 26 can be altered in order to receive pipes or tubes of varying diameter. The rotatable knurled knob 50 has markings thereon to show the diameter of the pipe which can be treated by the present invention. As shown in FIG. 5 the cam 46 has a variety of cam flats to allow treatment of pipe diameters ranging 15 mm, 16 mm, 18 mm, 19 mm, 20 mm and 22 mm. As will be realised, different cams may be used to extend the range of pipes to be treated by the present invention.

On the other side of the central opening 18 from the support assembly 26, there is a circumferentially extending recess 33 which has a deeper central portion providing a cam slot 34. This defines a linearly parallel sided slot which is formed along a line tangential to an arc struck about the axis of the opening 18. The pipe-treating wheel comprises a form roller 38 which is rotationally fast with a pivot pin 40 engaged in the cam slot 34. Thus the pin 40 can roll along the cam slot, with corresponding rotation of the form roller 38. A spring 42 urges the form roller 38 away from the radially outer end of the cam slot 34. The spring 42 is mounted in a recess 43 formed in the portion 12 of the body 10 and bears against the pivot pin 40.

Figure 1:
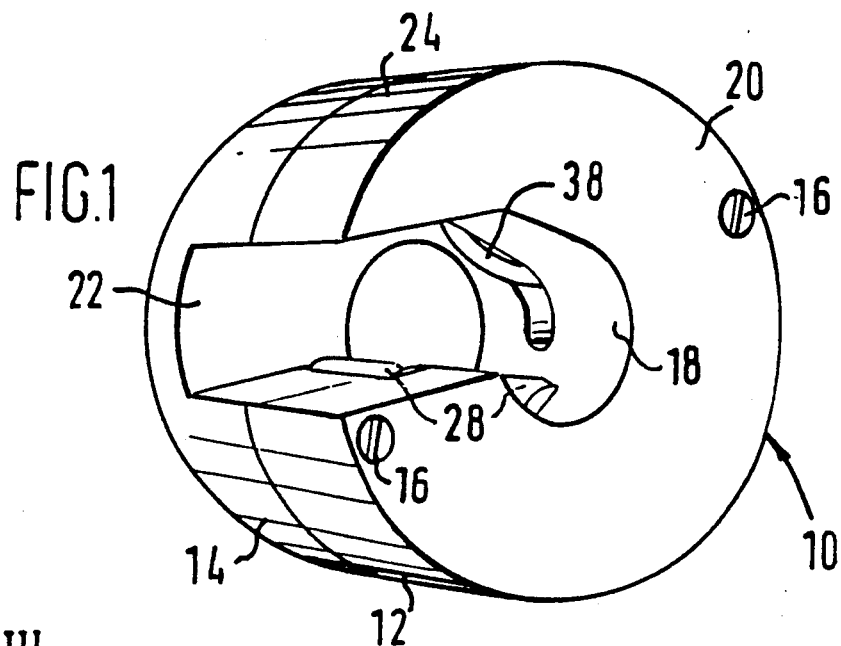
FIG. 1 is a perspective view of a pipe grooving or swaging tool.
Figure 2:
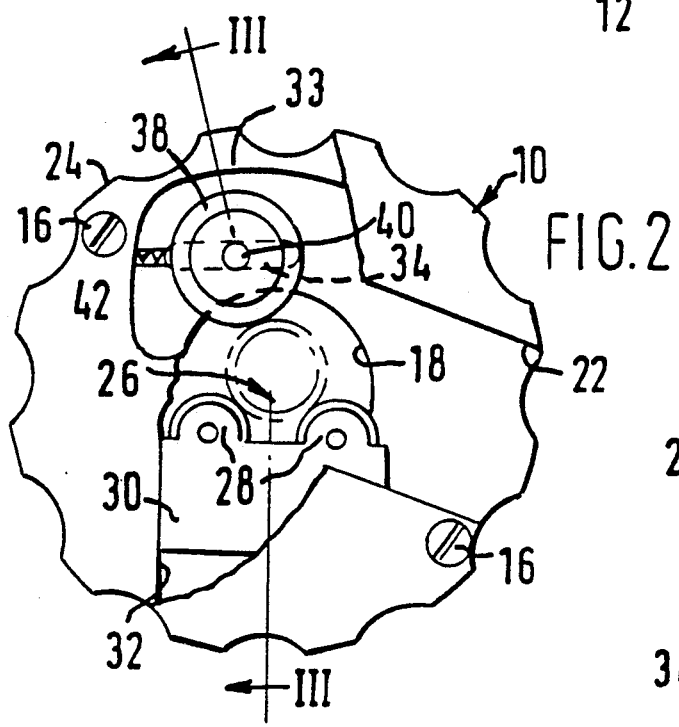
FIG. 2 is an axial view of the tool, partly cut away, and showing a different external form.
Figure 4:
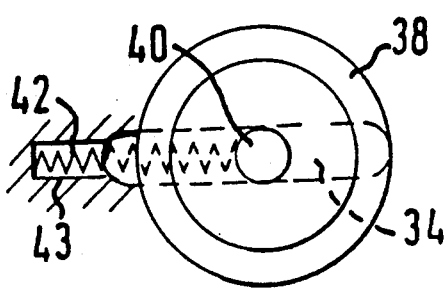
FIG. 4 is a scrap view of parts seen in FIG. 2, but to a larger scale.

In use, the pipe support assembly 26 is adjusted to a position appropriate to the pipe diameter by turning the knurled knob 50 to the appropriately indicated pipe diameter as shown in FIG. 5. An end portion of the pipe is then located in the tool. This can easily be done by pushing it in through the lateral opening 22. In the process, the pipe portion pushes the form wheel 38 to the radially outermost end of the cam slot. The spring 42 is thus urging the form roller 38 against the pipe. The pipe is pushed axially relative to the tool so that it abuts against the end face defining the central opening 18. (As shown in FIG. 3 there may be a special abutment piece 44). The tool is then rotated relative to the pipe. As viewed in FIG. 2 or FIG. 5 the tool is turned anticlockwise. (To assist this, it is provided with a suitable gripping surface on the cylindrical face 24, e.g. knurled as shown in FIG. 1, or scalloped as shown in FIG. 2). Friction between the form roller 38 and the pipe causes the roller to rotate, and to tend to move along the cam slot 34 in a clockwise sense as seen in FIG. 2, so that it moves gradually radially inwardly. Rotation of the tool is continued for several complete rotations, until the pivot pin 40 of the form roller has reached the end of the slot 34. The form roller 38 is then projecting into the central opening 18 by a predetermined degree, and has thus formed a groove of predetermined depth in the pipe portion.

For successful operation of the device, it is necessary for the path of the cam slot 34 to be suitable. If it comes radially inwardly too steeply, the tool will not work, because the form roller 38 will bite into the pipe and jam. But if the travel is too gradual, the form roller 38 will simply skate over the surface of the pipe, without being forced to travel along the path and form a groove in the pipe. The cam 46 may be replaced by a larger cam in order to provide adjustability in the range 10–16 mm diameter of pipe.

If the central opening 18 does not extend fully through the body, the tool is suitable for providing pipes with grooves a standard distance from their ends. Of course, a tool as described can have a through-bore so that it can be located anywhere along the length of a pipe. This will generally be the case where the tool is arranged as a pipe cutting tool. A pipe cutting tool is constructed in the same way as the illustrated grooving tool, but the pipe-treating wheel comprises a cutting wheel in place of form roller 38.

The lateral opening 22 may also extend through the entire thickness of the tool. This gives the added advantage that it may be used to cut a pipe where one or both ends are attached to existing fittings or are otherwise inaccessible.

Figure 7:
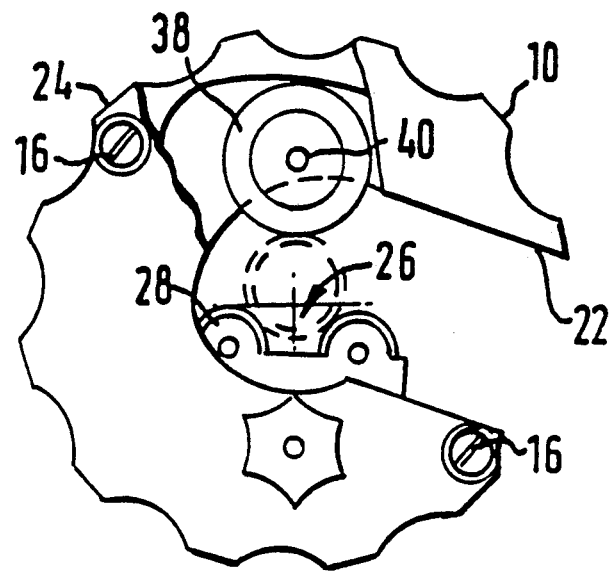
FIG. 7 is a side view of another embodiment.

In a further embodiment illustrated in FIG. 7, a cutting wheel 38 is rotatably mounted about its axis, its pin 40 being located in holes in the body of the tool. Upon insertion of the pipe between the support rollers 28 and the cutting wheel 38, the inherent stiffness of the material of which the body is made tends to urge the cutting wheel 38 into close abutment with the pipe.

Figure 8:
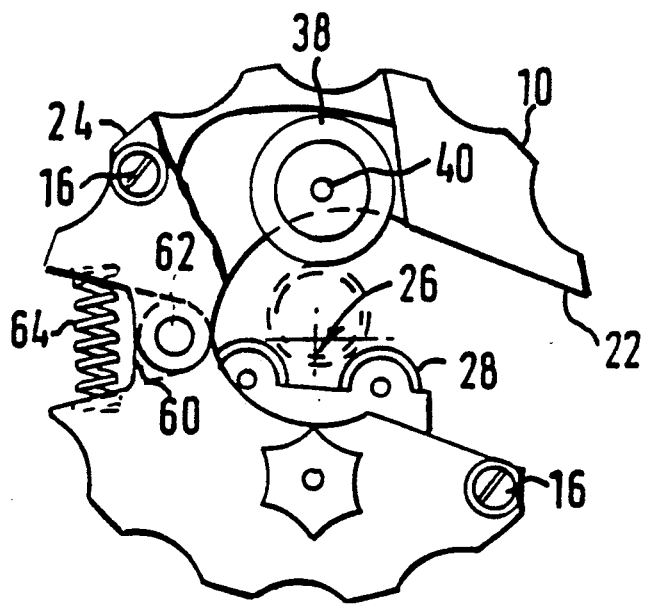
FIG. 8 is a side view of a further embodiment.

In a yet further embodiment shown in FIG. 8, the body of the tool is formed in two parts hinged at 60 about pin 62. There is provided a strong compression spring 64 for urging that part in which the cutting wheel 38 is supported towards the pipe.

Various modifications may be made to the tool as described without departing from the invention.

The pipe grooving or cutting tool is described as being formed of metal. It may, of course, be manufactured from a plastics material by, for example, injection moulding.

Furthermore, the abutment piece 44 may be made adjustable to readily vary the location of the circumferential groove from the end of the pipe.

I claim:
1. A tool for treating a pipe, said tool comprising:
a body having an aperture for receiving a portion of the pipe to be treated,
pipe support means displaceably mounted on the body so as to be displaceable to project into the aperture to a variable extent,
a pipetreating wheel rotatably mounted on the body so that the pipe portion in the aperture is engageable between the pipe-treating wheel and the pipe support means, the pipetreating wheel being displaceable along a predetermined path relative to the pipe portion such that its operative portion moves inwardly relative to the pipe portion, and
a rotatably mounted cam arranged to adjust the position of the support means.

2. A tool as claimed in claim 1, wherein the cam has a plurality of cam flats arranged at respective predetermined distances from a rotational axis of the cam, wherein said cam controls the extent to which the pipe support means projects into the aperture.

3. A tool as claimed in claim 1, in which the support means comprises two support rollers arranged to define an isosceles triangle with the pipe-treating wheel when the pipe-treating wheel is at an intermediate location on its path, the support rollers being mounted on a block which is displaceable along an axis of symmetry of the triangle.

4. A tool as claimed in claim 1, in which the operative portion of the pipe-treating wheel moves both radially and circumferentially relative to the pipe portion, the path being selected so that, when the tool is rotated relative to the pipe, the pipe-treating wheel is urged against the pipe to effect treatment.

5. A tool as claimed in claim 4, in which the path of the pipe-treating wheel is tangential to an arc of a circle whose centre lies at the centre of the tool.

6. A tool as claimed in claim 1, in which the pipetreating wheel is rotationally fixed with an axle pin which is rotatably located in an elongate slot which defines said predetermined path of displacement.

7. A tool as claimed in claim 6, in which said elongate slot is a linear slot.

8. A tool as claimed in claim 1, in which the body of the tool is formed in two parts, one part carrying the pipe-treating wheel and the other part carrying the pipe support means, the two parts being hingedly connected together, and the tool further comprises a compression spring arranged to urge the two parts of the tool together.

9. A tool as claimed in claim 1, in which the tool includes means for urging the pipe-treating wheel inwardly along said predetermined path.

10. A tool as claimed in claim 1, in which the pipe-treating wheel comprises a form roller for forming a circumferential groove in the pipe.

11. A tool as claimed in claim 1, in which the pipe-treating wheel comprises a cutting wheel for cutting the pipe.

12. A hand-powered tool for treating a pipe, said tool comprising:
- a body having an aperture for receiving a portion of the pipe to be treated,
- pipe support means displaceably mounted on the body so as to be displaceable to project into the aperture to a variable extent,
- a pipetreating wheel rotatably mounted on the body so that the pipe portion in the aperture is engageable between the pipe-treating wheel and the pipe support means, the pipetreating wheel being displaceable along a predetermined path relative to the pipe portion such that its operative portion moves inwardly relative to the pipe portion,
- a rotatably mounted cam arranged to adjust the position of the support means, and
- a manually operable knob, the cam being rotatable by means of the knob between a plurality of predetermined rotary positions at each of which the tool is correctly set for treating a pipe of a particular diameter.

13. A tool as claimed in claim 12, wherein the cam has a plurality of cam flats arranged at respective predetermined distances from a rotational axis of the cam, wherein said cam controls the extent to which the pipe support means projects into the aperture.

14. A tool as claimed in claim 12, in which the support means comprises two support rollers arranged to define an isosceles triangle with the pipe-treating wheel when the pipe-treating wheel is at an intermediate location on its path, the support rollers being mounted on a block which is displaceable along an axis of symmetry of the triangle.

15. A tool as claimed in claim 12, in which the operative portion of the pipe-treating wheel moves both radially and circumferentially relative to the pipe portion, the path being selected so that, when the tool is rotated relative to the pipe, the pipe-treating wheel is urged against the pipe to effect treatment.

16. A tool as claimed in claim 15, in which the path of the pipe-treating wheel is tangential to an arc of a circle whose centre lies at the centre of the tool.

17. A tool as claimed in claim 12, in which the pipe-treating wheel is rotationally fixed with an axle pin which is rotatably located in an elongate slot which defines said predetermined path of displacement.

18. A tool as claimed in claim 17, in which said elongate slot is a linear slot.

19. A tool as claimed in claim 12, in which the body of the tool is formed in two parts, one part carrying the pipe-treating wheel and the other part carrying the pipe support means, the two parts being hingedly connected together, and the tool further comprises a compression spring arranged to urge the two parts of the tool together.

20. A tool as claimed in claim 12, in which the tool includes means for urging the pipe-treating wheel inwardly along said predetermined path.

* * * * *